UNITED STATES PATENT OFFICE.

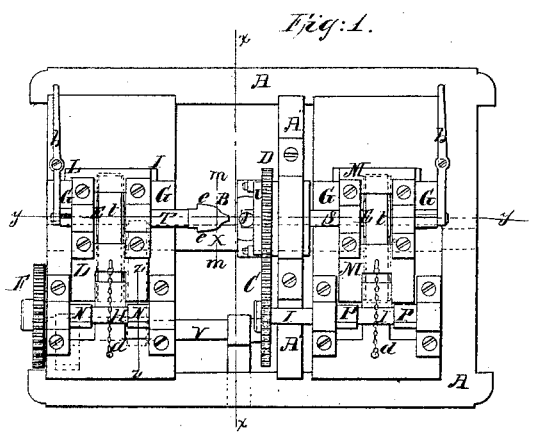

ELBRIDGE WEBBER, OF GARDINER, MAINE.

MACHINE FOR MAKING HEAD PART OF SHOVEL-HANDLES.

Specification of Letters Patent No. 11,915, dated November 7, 1854.

*To all whom it may concern:*

Be it known that I, ELBRIDGE WEBBER, of Gardiner, in the county of Kennebec and State of Maine, have invented a new and useful Improvement in Machines for Forming the Opening in the Heads of Shovel-Handles; and I do hereby declare that the following is a full, clear, and exact description of the construction and operation of the same, reference being had to the annexed drawing, forming part of this specification, in which—

Figure 1 is a plan of the machine. Fig. 2 is a side elevation of the same. Fig. 3 is a vertical section on line $x\ x$ of Fig. 1. Fig. 4 is a vertical section of the upper portion of the machine, taken on line $y\ y$ of Fig. 1. Fig. 5 is a section of cam and carriage on line $z\ z$ Fig. 1. Fig. 6 is a cross section of cutters on line $m\ m$, Figs. 1 and 2.

Similar letters denote the same part.

The nature of my invention consists in the combination and arrangement of mechanism by which the opening in the head of the handle is formed by the simultaneous action of two cutters on opposite sides of the handle; said cutters moving longitudinally and laterally during their rotation as will be hereafter fully set forth.

To enable others skilled in the art to make and use my invention I will proceed to describe its construction and operation.

In the drawing A is the frame on which rests the carriages L and M each supporting a rotary cutter B B' as shown in Fig. 4. The handle, fully finished with the exception of the opening, is supported on the face of a rim U which rests on the piece A' and is revolved by the meshing of the cog wheels C and D, the latter forming a portion of the said rim U. The cutter shafts S T have in each a slot $a$ in which fits a small tongue $c$ of the pulley E, permitting the shafts to have a longitudinal motion through the pulley, during the rotation of the same: this longitudinal motion being produced by means of the levers $b$ secured to the extremities of the shafts S T. The carriages move in their guides G by the action of the cams N P as shown in Fig. 5, and are drawn back by the weights W connected with the carriages by the chains $d$. The cam shafts H I are rotated by cog wheels F C equal in size to the wheel D of the rim U, so that the revolution of the cams shall be the same as that of the rim holding the handle J. The cutters are of the form shown in Fig. 6, having two cutting edges $e$ and $e'$.

The operation of my improved machine is as follows: The handle J is first secured on the edge of the rim U as shown in Fig. 3, after which motion is communicated to the shaft X, producing through the wheels $f$, F, $h$, C, and D, and shaft V a revolution of the cams and handle of the same velocity, and by the belts $t$ a revolution of the cutter shafts. The cams N and P which are of the proper form to cause the cutters to mark out the opening in the head, move the carriages in the ways during the rotation of the cutters, while the operator by moving the levers $b$ causes the simultaneous longitudinal motion of the cutters. This causes each of the cutters to form one half of the opening, the operation being simultaneously performed on opposite sides of the handle.

What I claim as my invention and desire to secure by Letters Patent, is—

The longitudinal and lateral moving cutters, operating simultaneously on opposite sides of the handle, in combination with the cams moving the carriages, and the rotary support of the handle, constructed, arranged and operating substantially as hereinbefore set forth for the purpose specified.

In testimony whereof, I have hereunto signed my name before two subscribing witnesses.

ELBRIDGE WEBBER.

Witnesses:
  DANIEL NUTTING,
  GEO. W. WAITT.